(12) United States Patent
Dong

(10) Patent No.: US 12,405,343 B2
(45) Date of Patent: Sep. 2, 2025

(54) METHOD AND APPARATUS FOR POSITION DETERMINING, AND COMMUNICATION DEVICE

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 395 days.

(21) Appl. No.: 17/928,866

(22) PCT Filed: Jun. 5, 2020

(86) PCT No.: PCT/CN2020/094779
§ 371 (c)(1),
(2) Date: Nov. 30, 2022

(87) PCT Pub. No.: WO2021/243723
PCT Pub. Date: Dec. 9, 2021

(65) Prior Publication Data
US 2023/0213607 A1 Jul. 6, 2023

(51) Int. Cl.
  G01S 5/00 (2006.01)
  G01S 5/02 (2010.01)
  G01S 5/14 (2006.01)
  G01S 13/76 (2006.01)
(52) U.S. Cl.
  CPC .......... G01S 5/0063 (2013.01); G01S 5/0289 (2013.01); G01S 5/14 (2013.01); G01S 13/765 (2013.01)

(58) Field of Classification Search
  CPC ......... G01S 5/0063; G01S 5/0289; G01S 5/14
  See application file for complete search history.

(56) References Cited

U.S. PATENT DOCUMENTS

2014/0302784 A1* 10/2014 Kim ................. H04W 8/005
455/41.2

FOREIGN PATENT DOCUMENTS

| CN | 101536596 A | 9/2009 |
| CN | 102210180 A | 10/2011 |
| WO | WO 2014165386 A2 | 10/2014 |

OTHER PUBLICATIONS

European Patent Application No. 20939443.6 Search Report dated Apr. 11, 2024, 7 pages.
PCT/CN2020/094779 English translation of International Search Report dated Feb. 23, 2021, 3 pages.

* cited by examiner

*Primary Examiner* — Myron Wyche
(74) *Attorney, Agent, or Firm* — Cozen O'Connor

(57) ABSTRACT

A method for position determining includes: sending a first ranging request to a base station, wherein the first ranging request carries an identifier associated with a second UE, in which the first ranging request is at least associated with ranging between the base station and the second UE; and receiving first range information associated with the first range request from the base station.

18 Claims, 5 Drawing Sheets

METHOD AND APPARATUS FOR POSITION DETERMINING, AND COMMUNICATION DEVICE

CROSS-REFERENCE TO RELATED APPLICATION

This application is a U.S. national phase of International Application No. PCT/CN2020/094779, filed on Jun. 5, 2020, the entire content of which is incorporated herein by reference.

FIELD

The present disclosure relates to a field of wireless communication technologies, but is not limited to the field of wireless communication technologies, particularly to a method and an apparatus for position determining, a communication device and a storage medium.

BACKGROUND

Currently, a variety of positioning technologies have been standardized in the area of cellular mobile communication, which can be used to determine the positioning of a user equipment (UE). The network side can request the positioning of UE, and the UE can also request its own positioning.

The positioning between remote UEs is generally realized by exchanging position information through a positioning server on the network side. The cellular mobile communication standard cannot support the mutual positioning directly between UEs.

SUMMARY

According to a first aspect of the present disclosure, a method for position determining is provided. The method is performed by a user equipment (UE), and the method includes:
  sending a first ranging request to a base station, in which the first ranging request carries an identifier associated with a second UE, in which the first ranging request is at least associated with ranging between the base station and the second UE; and
  receiving first range information associated with the first range request from the base station.

According to a second aspect of the present disclosure, a method for position determining is provided. The method is performed by a base station, and the method includes:
  receiving a first ranging request from a first user equipment (UE), in which the first ranging request carries an identifier associated with a second UE, and the first ranging request is at least associated with ranging between the base station and the second UE; and
  sending first range information to the first UE in response to the first range request.

According to a third aspect of the present disclosure, a communication device is provided. The communication device includes a processor, a transceiver, a memory and programs stored on the memory and executable by the processor. When the processor executes the executable programs, the method for position determining according to the first aspect or the second aspect is performed.

It should be understood that the above general description and the following detailed description are only illustrative and explanatory, and do not limit the embodiments of the present disclosure.

BRIEF DESCRIPTION OF THE DRAWINGS

The drawings herein are incorporated into the specification and constitute a part of the specification, showing the embodiments conforming to the disclosure, and are used together with the specification to explain the principles of the embodiments of the disclosure.

DETAILED DESCRIPTION

Exemplary embodiments will be described in detail here, and their examples are shown in the accompanying drawings. When the following description refers to the drawings, unless otherwise indicated, the same number in different drawings indicates the same or similar elements. The embodiments described in the following exemplary embodiments do not represent all embodiments consistent with the embodiments of the disclosure. On the contrary, they are only examples of devices and methods consistent with some aspects of the embodiments of the disclosure as detailed in the appended claims.

The terms used in the embodiments of the present disclosure are only for the purpose of describing specific embodiments, and are not intended to limit the embodiments of the present disclosure. The singular forms of "one", "said" and "the" used in the embodiments of the present disclosure and the appended claims are also intended to include the majority forms, unless the context clearly indicates other meanings. It should also be understood that the terms "and/or" as used herein refer to and include any or all possible combinations of one or more associated listed items.

It should be understood that although the terms first, second, third, etc. may be used to describe various information in the embodiments of the present disclosure, such information should not be limited to these terms. These terms are only used to distinguish the same type of information from each other. For example, without departing from the scope of the embodiments of the present disclosure, the first information can also be called the second information, and similarly, the second information can also be called the first information. Depending on the context, the word "if" as used here can be interpreted as "when" or "while" or "in response to determining".

Figure 1:
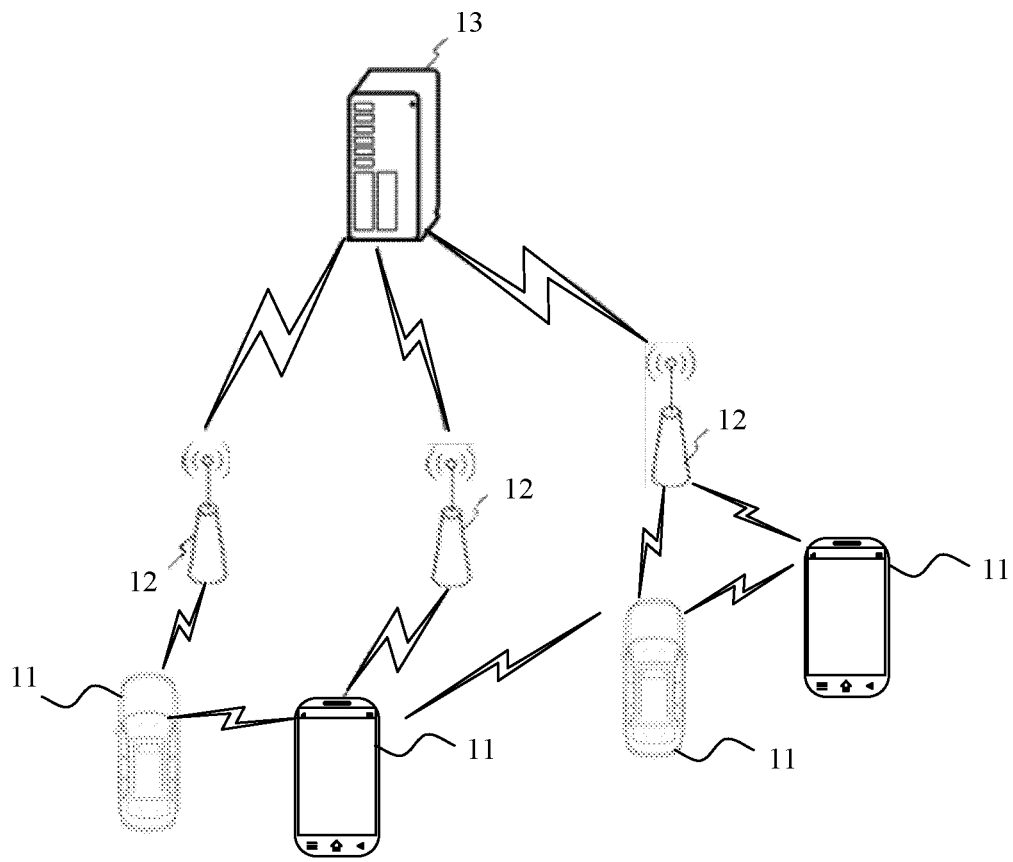
FIG. 1 is a block diagram of a wireless communication system according to an exemplary embodiment of the present disclosure.

As illustrated in FIG. 1, it illustrates a block diagram of a wireless communication system provided by an embodiment of the present disclosure. As illustrated in FIG. 1, the wireless communication system is a communication system based on cellular mobile communication technology. The wireless communication system may include several terminals 11 and several base stations 12.

The terminal 11 may refer to a device that provides voice and/or data connectivity to a user. The terminal 11 can communicate with one or more core networks through a radio access network (RAN). The terminal 11 may be an Internet-of-Things terminal, such as a sensor device, a mobile phone (also called as "cellular" phone) and a computer with Internet-of-Things terminal, such as fixed, portable, pocket, handheld, computer built-in or vehicle-mounted devices, for example, a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 can also be the equipment of an unmanned aerial vehicle. Alternatively, the terminal 11 can also be an on-board device, for example, a trip computer with wireless communication function, or a wireless communication device connected to an external trip computer. Alternatively, the terminal 11 can also be a roadside device, for example, a streetlamp, a signal lamp or other roadside devices with wireless communication functions.

The base station 12 may be a network side device in the wireless communication system. The wireless communication system can be the fourth generation mobile communication (4G) system, also known as Long Term Evolution (LTE) system. Alternatively, the wireless communication system can also be the fifth generation mobile communication (5G) system, also known as a new radio (NR) system or a 5G NR system. Alternatively, the wireless communication system can also be a next generation system of the 5G system. The access network in the 5G system can be called NG-RAN (new generation radio access network). Alternatively, the wireless communication system can also be a machine type communication (MTC) system.

The base station 12 can be an evolutionary base station (eNB) used in the 4G system. Alternatively, the base station 12 can also be a centralized and distributed architecture (gNB) in the 5G system. When the base station 12 adopts the centralized and distributed architecture, it usually includes a central unit (CU) and at least two distributed units (DU). The central unit is equipped with protocol stacks of a Packet Data Convergence Protocol (PDCP) layer, a Radio Link Control (RLC) layer and a Media Access Control (MAC) layer. The distribution unit is provided with a physical (PHY) layer protocol stack. The embodiments of the present disclosure do not limit the specific implementation mode of the base station 12.

A wireless connection can be established between the base station 12 and the terminal 11 through a wireless radio. In different embodiments, the wireless radio is a wireless radio based on the fourth generation mobile communication network technology (4G) standard. Alternatively, the wireless radio is a wireless radio based on the fifth generation mobile communication network technology (5G) standard. For example, the wireless radio is a new radio. Alternatively, the wireless radio can also be a wireless radio based on a standard of the next generation mobile communication network technical of 5G.

In some embodiments, an E2E (End to End) connection can also be established between terminals 11, such as V2V (vehicle to vehicle) communication, V2I (vehicle to infrastructure) communication and V2P (vehicle to pedestrian) communication in vehicle to everything (V2X) communication.

In some embodiments, the wireless communication system described above may also include a network management device 13.

Several base stations 12 are connected to the network management device 13 respectively. The network management device 13 can be a core network device in the wireless communication system. For example, the network management device 13 can be a mobility management entity (MME) in an evolved packet core (EPC). Alternatively, the network management device can also be other core network devices, such as a service gateway (SGW), a public data network gateway (PGW), a policy and charging rules function (PCRF) or a home subscriber server (HSS). The embodiments of the present disclosure do not limit the implementation form of the network management device 13.

Execution subjects involved in the embodiments of the present disclosure include, but are not limited to, a user equipment (UE) in a cellular mobile communication system, a base station of the cellular mobile communication, etc.

Figure 2:
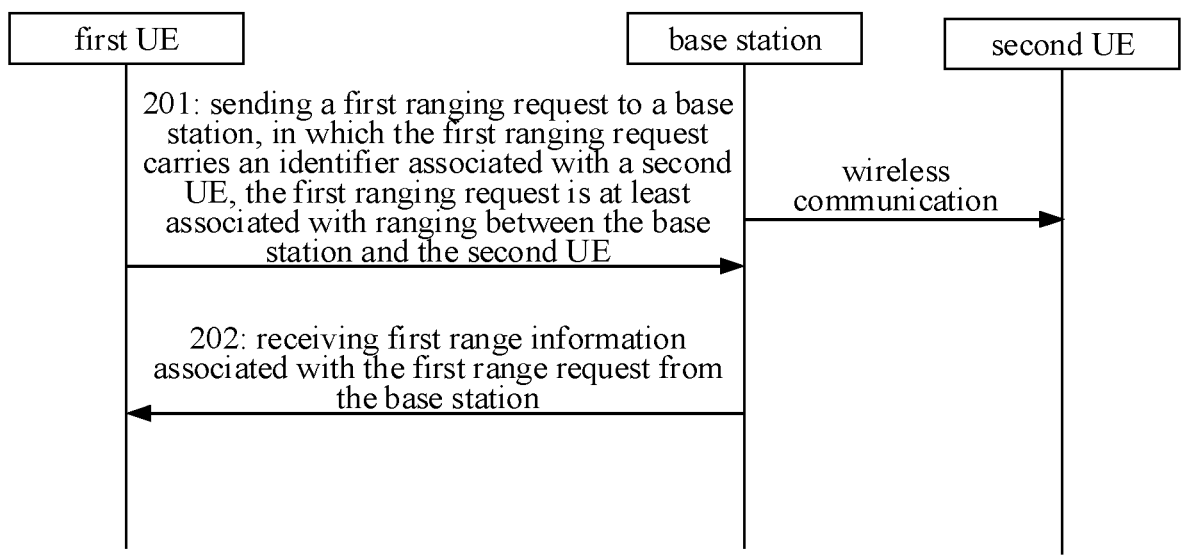
FIG. 2 is a flow chart of a method for position determining according to an exemplary embodiment of the present disclosure.

As shown in FIG. 2, this exemplary embodiment provides a method for position determining, which can be performed by the UE such as a terminal of a communication system. The method for position determining may include:

Step 201, a first ranging request is sent to a base station, in which the first ranging request carries an identifier associated with a second UE, in which the first ranging request is at least associated with ranging between the base station and the second UE.

Step 202, first range information associated with the first range request is received from the base station.

The communication system may be a cellular mobile communication system. The base station can be a base station in the cellular mobile communication system, and the first UE and the second UE can be UEs such as mobile terminals in the cellular mobile communication system. The first UE and the second UE may be two UEs residing in the same base station.

The first ranging request may be information for requesting a relative position. The first UE can send the first ranging request to the base station. After receiving the first ranging request, the base station can at least determine a relative position between the second UE and the base station.

Through ranging, a relative position between two devices can be obtained, and the relative position may include a distance between two communication devices, and an angle between a reference line and a straight line between the two communication devices. The communication device includes the first UE, the second UE, or the base station.

The relative position between the second UE and the base station may be determined by the base station based on position information of the base station and position information of the second UE. For example, it can be determined according to the position information of the base station and the position information of the second UE reported by the second UE. The position information of the second UE can be determined by the second UE using GPS. The relative position between the second UE and the base station can also be determined by the base station through a wireless signal of the cellular mobile communication.

In an optional embodiment, the base station can determine the relative position between the second UE and the base station in advance (for example, periodically, or when the UE is initially accessed), and the base station stores an associated result in a memory device of the base station. Thus, when receiving the first ranging request, the base station can directly send the relative position information between the base station and the second UE stored in the memory device to the first UE as the first ranging information.

The base station can also determine the distance between the second UE and the base station by means of TOF (time of flight), and determine the relative position between the second UE and the base station according to an angle of arrival of a signal sent by the second UE.

The first ranging request may carry an identifier of the first UE. When the first ranging request has both the identifier of the first UE and the identifier of the second UE, the base station can determine two UEs that need to determine a relative position between them. The base station can determine the relative position between the first UE and the base station and the relative position between the second UE and the base station respectively, and then determine the relative position between the first UE and the second UE. The base station can also send ranging signals for measuring TOF to the first UE and the second UE respectively.

The base station and the UE may agree in advance on an operation indicated by the identifier of the UE carried in the first ranging request. For example, when the first ranging request carries only the identifier of the second UE, it can indicate that it is the first UE that determines the relative position between the first UE and the second UE, and the base station may provide the relative position between the base station and the second UE to the first UE.

The first ranging information can be used for the first UE to determine the relative position between the first UE and the second UE. The first ranging information may include: the relative position information between the second UE and the base station, the relative position information between the first UE and the second UE determined by the base station, and/or the relative position information between the first UE and the base station determined by the base station.

In another embodiment, the base station can determine whether information interaction with the first UE is required according to the identifier of the first UE in the first ranging request, and then the base station determines a position of the first UE relative to the base station. Alternatively, the base station determines, according to an instruction carried by the first ranging request, whether information interaction with the first UE is required, so as to determine the position of the first UE relative to the base station.

In this way, on the one hand, the relative positioning between UEs is realized, on the other hand, the communication connection between UEs is no longer required, and the positioning of UEs is realized with the help of existing base station.

In an embodiment, receiving the first ranging information associated with the first ranging request received from the base station includes follows.

First ranging information indicating the relative position between the first UE and the second UE is received from the base station.

It can be defined by a communication protocol or negotiated by the base station and the UE whether calculating the relative position between the first UE and the second UE is performed by the base station or the first UE.

For example, it can be determined that the base station sends the relative position between the base station and the second UE to the UE according to the instruction in the first ranging request, or that the base station calculates the relative position between the first UE and the second UE and sends it to the first UE.

Alternatively, the base station can determine that it is the base station itself sends the relative position between the base station and the second UE to the UE, or the base station can calculate the relative position between the first UE and the second UE and send it to the first UE.

Figure 3:
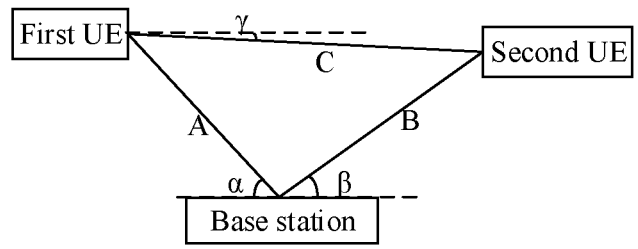
FIG. 3 is a schematic diagram illustrating relative positions according to an exemplary embodiment of the present disclosure.

As shown in FIG. 3, when the relative position between the first UE and the base station, i.e., distance A and included angle $\alpha$, and the relative position between the second UE and the base station, i.e., distance B and included angle $\beta$, are known, the relative position between the first UE and the second UE, i.e., distance C and included angle $\gamma$, can be determined based on trigonometric functions and other calculation methods.

The relative position between the first UE and the second UE can be calculated by the base station. The base station can determine the relative position between the first UE and the second UE based on the relative position between the first UE and the base station and the relative position between the second UE and the base station.

A relative position between a UE and the base station can be determined by the base station or the UE based on position information of the base station and the UE. For example, the UE can determine the relative position between the UE and the base station according to the position information of the base station and the position information of the UE. The position information of the UE can be determined by the UE using GPS. Alternatively, the base station can determine the relative position between the UE and the base station according to the position information reported by the UE. The relative position between the UE and the base station can also be determined by the base station through existing positioning methods. The UE may include the first UE and/or the second UE.

The relative position between the first UE and the base station, and the relative position between the second UE and the base station can also be determined by measurement results the signals between the base station and the UEs.

For example, the base station receives the first ranging request. The base station determines the relative position between the first UE and the second UE according to the relative position between the first UE and the base station and the relative position between the second UE and the base station, and the base station sends the relative position between the first UE and the second UE to the first UE through the first ranging information.

In this way, in a condition that the first UE does not establish a direct communication connection with the second UE, the UE acquires the relative position between the first UE and the second UE from the base station, reducing the complexity caused by establishing the direct communication connection between the first UE and the second UE, and improving the efficiency of the first UE in determining the relative position between the first UE and the second UE.

In an embodiment, the method further includes followings.

A relative position between the first UE and the base station is determined according to a receiving parameter of a wireless signal between the first UE and the base station;

A second ranging information indicating the relative position between the first UE and the base station is sent to the base station.

In an embodiment, the first UE can determine a distance between the first UE and the base station according to the receiving parameter of the wireless signal between the first UE and the base station. The receiving parameter may include the time of flight (TOF) of the wireless signal, an angle of arrival of the wireless signal, etc.

For example, the first UE can determine the distance between the first UE and the base station by measuring the TOF of a signal. One way for implementing TOF may be as follows. The base station can send a positioning signal to the first UE, and the positioning signal can carry a sending time point of sending the positioning signal by the base station. The first UE can determine the time of flight of the positioning signal based on a receiving time point of receiving the positioning signal and the sending time point of sending the positioning signal, and then determines the distance between the first UE and the base station.

In another example, the first UE sends a positioning signal to the base station, such as the first ranging request. The base station sends a response message to the first UE after receiving the positioning signal, and the response message contains a response delay to the positioning signal. After receiving the response message, the first UE can determine the time of flight of the signal according to a time point of sending the positioning signal, a time point of receiving the response information and the response delay, and then determines the distance between the first UE and the base station.

The first UE can also determine an arrival angle of the positioning signal according to a reception time difference between different antennas of the first UE and the distance between the antennas.

The relative position between the first UE and the base station is determined based on the distance between the first UE and the base station and the arrival angle of the positioning signal.

When the base station determines the relative position between the first UE and the second UE, the first UE can send the relative position between the first UE and the base station determined by the first UE to the base station through the second ranging information.

In another embodiment, the receiving parameter may include a reception power and a reception angle.

The first UE can determine attenuation in a positioning signal transmission process based on a sending power of sending the positioning signal by the base station and a receiving power of receiving the positioning signal by the first UE, so as to determine the distance between the first UE and the base station. The first UE can determine an arrival angle of the positioning signal according to the reception time difference between different antennas of the first UE and the distance between the antennas. The relative position between the first UE and the base station is determined according to the distance between the first UE and the base station and the arrival angle of the positioning signal.

In an embodiment, receiving the first ranging information associated with the first ranging request from the base station includes:
  receiving, from the base station, the first ranging information indicating a relative position between the second UE and the base station.
The method further comprises:
  determining a relative position between the first UE and the second UE based on the relative position between the first UE and the base station, and the relative position between the second UE and the base station determined based on the ranging.
The relative position between the first UE and the second UE can be calculated by the first UE. The base station can also determine the relative position between the first UE and the second UE based on the relative position between the first UE and the base station, and the relative position between the second UE and the base station.

The relative position between the first UE and the base station can be determined by the first UE based on its own position and a position of the base station sent by the base station. The relative position between the first UE and the base station can also be determined by measuring a signal between the base station and the first UE.

The relative position between the second UE and the base station can be sent to the first UE by the base station. The relative position between the second UE and the base station can be determined by the base station based on geographic coordinates of the base station and the second UE, or determined by the base station through a measurement result of signals between the base station and the second UE, or sent to the base station after the second UE determines the relative position between the second UE and the base station.

For example, the base station can determine a distance between the second UE and the base station by measuring a signal TOF. One way to realize TOF can be as follows. The base station can send a positioning signal to the second UE, and the positioning signal can carry a sending time point of sending the positioning signal by the base station. The second UE can determine time of flight of the positioning signal based on a receiving time point of receiving the positioning signal and the sending time point of sending the positioning signal, and then determines the distance between the second UE and the base station.

For example, the base station receives the first ranging request, determines the relative position between the second UE and the base station, and determines the relative position between the first UE and the second UE based on the relative position between the second UE and the base station, and the relative position between the first UE and the base station.

In a process of determining the relative position between the first UE and the second UE, it is not necessary to establish a direct communication connection between the first UE and the second UE. Thus, no additional communication protocol is required to coordinate the direct communication connection between the first UE and the second UE, and it is not necessary to consider whether signal qualities of the first UE and the second UE can meet the requirement of direct communication with each other. In this way, in a case that the first UE and the second UE do not establish the direct communication connection, the first UE obtains the relative position between the second UE and the base station from the base station, and then determines the relative position between the first UE and the second UE based on the relative position between the second UE and the base station, and the relative position between the first UE and the base station, reducing the complexity caused by the need to establish the direct communication connection between the first UE and the second UE, and improving the efficiency of the first UE in determining the relative position between the first UE and the second UE.

In an embodiment, the method further includes:
  determining the relative position between the first UE and the base station according to a receiving parameter of a wireless signal between the first UE and the base station.
When calculating the relative position between the first UE and the second UE is performed by the first UE, the first UE can determine the relative position between the first UE and the base station based on the receiving parameter of the wireless signal between the first UE and the base station.

The first UE can determine the distance between the first UE and the base station according to the receiving parameter of the wireless signal between the first UE and the base station. The receiving parameter can include the time of flight (TOF) of the wireless signal, the arrival angle of the wireless signal, etc.

For example, the first UE can determine the distance between the first UE and the base station by measuring the signal TOF. One way to realize TOF can be as follows. The base station can send a positioning signal to the first UE, and the positioning signal can carry a sending time point of sending the positioning signal by the base station. The first UE can determine the time of flight of the positioning signal based on a receiving time point of receiving the positioning signal and the sending time point of sending the positioning signal, and then determines the distance between the first UE and the base station.

For another example, the first UE sends a positioning signal to the base station, such as the first ranging request. The base station sends a response message to the first UE after receiving the positioning signal, and the response message contains a response delay to the positioning signal. After receiving the response message, the first UE can determine the time of flight of the signal according to the time point of sending the positioning signal, the time point of receiving the response message and the response delay, and then determines the distance between the first UE and the base station.

The first UE can also determine the arrival angle of the positioning signal according to the reception time difference between different antennas of the first UE and the distance between the antennas.

The relative position between the first UE and the base station is determined based on the arrival angle of the positioning signal and the distance between the first UE and the base station.

In an embodiment, the method further includes:
receiving third ranging information determined by the base station according to a receiving parameter of a wireless signal between the first UE and the base station, in which the third ranging information is configured to indicate the relative position between the first UE and the base station.

When calculating the relative position between the first UE and the second UE is performed by the first UE, the relative position between the first UE and the base station can be sent to the first UE by the base station through the third ranging information.

The base station can determine the distance between the first UE and the base station on the base station side according to the receiving parameter of the wireless signal between the base station and the first UE. The receiving parameter can include the TOF of the wireless signal, the arrival angle of the wireless signal, etc. A method used by the base station to determine the relative position between the first UE and the base station is similar to the method used by the first UE to determine the relative position between the first UE and the base station, and will not be repeated here.

Figure 4:
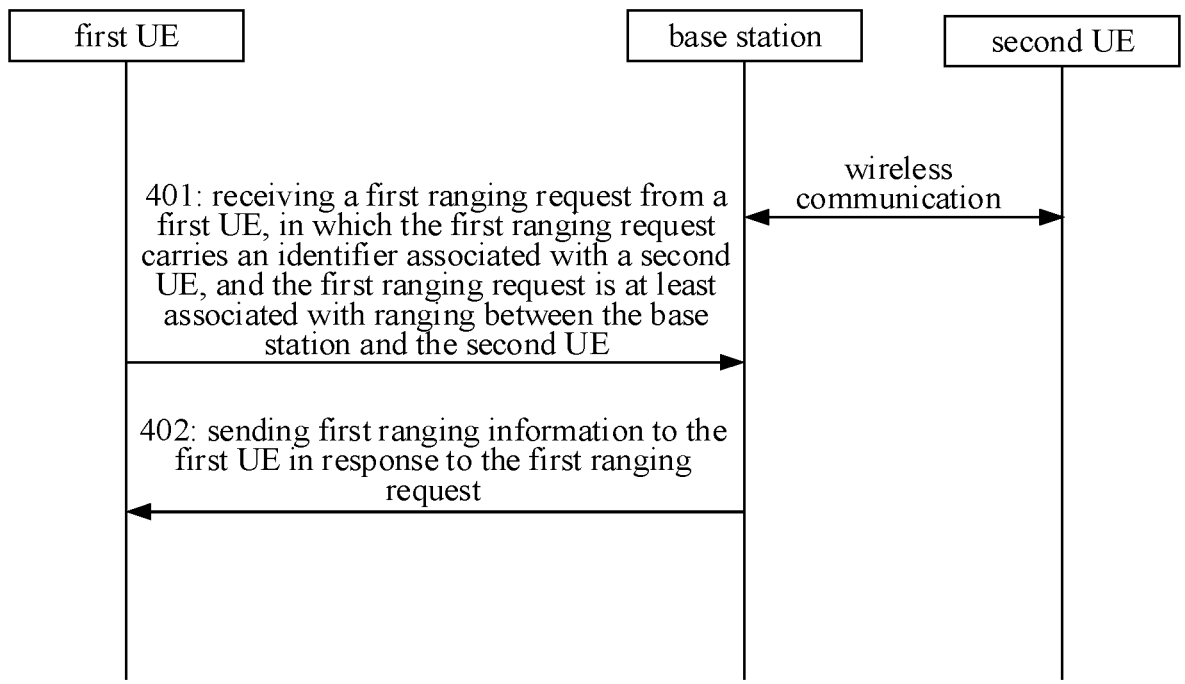
FIG. 4 is a flow chart of information interaction of a method for position determining according to an exemplary embodiment of the present disclosure.

As illustrated in FIG. 4, this exemplary embodiment provides a method for position determining, which can be performed by a base station of a communication system. The method for position determining can include follows.

Step 401, a first ranging request is received from a first user equipment (UE), in which the first ranging request carries an identifier associated with a second UE, and the first ranging request is at least associated with ranging between the base station and the second UE.

Step 402, first ranging information is sent to the first UE in response to the first ranging request.

The communication system may be a cellular mobile communication system. The base station can be a base station in the cellular mobile communication system, and the first UE and the second UE can be UEs such as mobile terminals in the cellular mobile communication system. The first UE and the second UE may be two UEs residing in the same base station.

The first ranging request may be information for requesting a relative position. The first UE can send the first ranging request to the base station. After receiving the first ranging request, the base station can at least determine a relative position between the second UE and the base station.

Through ranging, a relative position between two devices can be obtained, and the relative position may include a distance between two communication devices, and an angle between a reference line and a straight line between the two communication devices. The communication device includes the first UE, the second UE, or the base station.

The first ranging request may also carry an identifier of the first UE. When the first ranging request has both the identifier of the first UE and the identifier of the second UE, the base station can determine two UEs that need to determine a relative position between them. The base station can determine the relative position between the first UE and the base station and the relative position between the second UE and the base station respectively, and then determine the relative position between the first UE and the second UE. The base station can also send ranging signals for measuring TOF to the first UE and the second UE respectively.

The base station and the UE may agree in advance on an operation indicated by the identifier of the UE carried in the first ranging request. For example, when the first ranging request carries only the identifier of the second UE, it can indicate that it is the first UE that determines the relative position between the first UE and the second UE, and the base station may provide the relative position between the base station and the second UE to the first UE.

The first ranging information can be used for the first UE to determine the relative position between the first UE and the second UE. The first ranging information may include: the relative position information between the second UE and the base station, the relative position information between the first UE and the second UE determined by the base station, and/or the relative position information between the first UE and the base station determined by the base station.

In another embodiment, the base station can determine whether information interaction with the first UE is required according to the identifier of the first UE in the first ranging request, and then the base station determines a position of the first UE relative to the base station. Alternatively, the base station determines, according to an instruction carried by the first ranging request, whether information interaction with the first UE is required, so as to determine the position of the first UE relative to the base station.

In this way, on the one hand, the relative positioning between UEs is realized; on the other hand, the communication connection between UEs is no longer needed, and the positioning of UEs is realized with the help of existing base station.

In one embodiment, the method further includes:
obtaining a relative position between the second UE and the base station by performing the ranging between the base station and the second UE according to the first ranging request.

The relative position between the second UE and the base station may be determined by the base station based on position information of the base station and position information of the second UE. For example, it can be determined according to the position information of the base station and the position information of the second UE reported by the second UE. The position information of the second UE can be determined by the second UE using GPS. The relative position between the second UE and the base station can also be determined by the base station through a wireless signal of the cellular mobile communication.

The base station can also determine a distance between the second UE and the base station by means of TOF, and determine the relative position between the second UE and the base station according to an arrival angle of a signal sent by the second UE.

In an optional embodiment, the base station can determine the relative position between the second UE and the base station in advance (for example, periodically, or when the UE is initially accessed), and the base station stores an associated result in a memory device of the base station. Thus, when receiving the first ranging request, the base station can directly send the relative position information between the base station and the second UE stored in the memory device to the first UE as the first ranging information.

In an embodiment, the method further includes:
determining a relative position between the first UE and the second UE based on a relative position between the first UE and the base station and the relative position between the second UE and the base station.

Sending the first range information to the first UE includes:
sending the first ranging information indicating the relative position between the first UE and the second UE to the first UE.

It can be defined by a communication protocol or negotiated by the base station and the UE whether calculating the relative position between the first UE and the second UE is performed by the base station or the first UE.

For example, it can be determined that the base station sends the relative position between the base station and the second UE to the UE according to the instruction in the first ranging request, or that the base station calculates the relative position between the first UE and the second UE and sends it to the first UE.

Alternatively, the base station can determine that it is the base station itself sends the relative position between the base station and the second UE to the UE, or the base station can calculate the relative position between the first UE and the second UE and sends it to the first UE.

As shown in FIG. 3, when the relative position between the first UE and the base station, i.e., distance A and included angle α, and the relative position between the second UE and the base station, i.e., distance B and included angle β, are known, the relative position between the first UE and the second UE, i.e. distance C and included angle γ, can be determined based on trigonometric functions and other calculation methods.

The relative position between the first UE and the second UE can be calculated by the base station. The base station can determine the relative position between the first UE and the second UE based on the relative position between the first UE and the base station and the relative position between the second UE and the base station.

A relative position between a UE and the base station can be determined by the base station or the UE based on position information of the base station and the UE. For example, the UE can determine the relative position between the UE and the base station according to the position information of the base station and the position information of the UE. The position information of the UE can be determined by the UE using GPS. Alternatively, the base station can determine the relative position between the UE and the base station according to the position information reported by the UE. The relative position between the UE and the base station can also be determined by the base station through existing positioning methods. The UE may include the first UE and/or the second UE.

The relative position between the first UE and the base station, and the relative position between the second UE and the base station can also be determined by measurement results of the signals between the base station and the UEs.

For example, the base station receives the first ranging request. The base station determines the relative position between the first UE and the second UE according to the relative position between the first UE and the base station and the relative position between the second UE and the base station, and the base station sends the relative position between the first UE and the second UE to the first UE through the first ranging information.

In this way, in a condition that the first UE does not establish a direct communication connection with the second UE, the UE acquires the relative position between the first UE and the second UE from the base station, reducing the complexity caused by establishing the direct communication connection between the first UE and the second UE, and improving the efficiency of the first UE in determining the relative position between the first UE and the second UE.

In an embodiment, the method further includes:
receiving second ranging information determined by the first UE according to a receiving parameter of a wireless signal between the first UE and the base station, in which the second ranging information is configured to indicate the relative position between the first UE and the base station.

The first UE can determine a distance between the first UE and the base station according to the receiving parameter of the wireless signal between the first UE and the base station. The receiving parameter may include the time of flight (TOF) of the wireless signal, an arrival angle of the wireless signal, etc.

For example, the first UE can determine the distance between the first UE and the base station by measuring the TOF of a signal. One way for implementing TOF may be as follows. The base station can send a positioning signal to the first UE, and the positioning signal can carry a sending time point of sending the positioning signal by the base station. The first UE can determine the time of flight of the positioning signal based on a receiving time point of receiving the positioning signal and the sending time point of sending the positioning signal, and then determines the distance between the first UE and the base station.

The first UE can also determine an arrival angle of the positioning signal according to a reception time difference of different antennas of the first UE and the distance between the antennas.

The relative position between the first UE and the base station is determined based on the distance between the first UE and the base station and the arrival angle of the positioning signal.

When the base station determines the relative position between the first UE and the second UE, the first UE can send the relative position between the first UE and the base station determined by the first UE to the base station through the second ranging information.

In another embodiment, the receiving parameter may include a reception power and a reception angle.

The first UE can determine attenuation in a positioning signal transmission process based on a sending power of sending the positioning signal by the base station and a receiving power of receiving the positioning signal by the first UE, so as to determine the distance between the first UE and the base station. The first UE can determine an arrival angle of the positioning signal according to the reception time difference between different antennas of the first UE and the distance between the antennas. The relative position between the first UE and the base station is determined according to the distance between the first UE and the base station and the arrival angle of the positioning signal.

In an embodiment, the method further includes:
determining the relative position between the first UE and the base station according to a receiving parameter of a wireless signal between the first UE and the base station.

When calculating the relative position between the first UE and the second UE is performed by the base station, the relative position between the first UE and the base station can be determined by the base station.

The base station can determine the distance between the first UE and the base station according to the receiving parameter of the wireless signal between the first UE and the base station. The receiving parameter can include TOF of the wireless signal, an arrival angle of the wireless signal, etc.

For example, the base station can determine the distance between the first UE and the base station by measuring TOF of a signal. One way to realize TOF can be as follows. The first UE can send a positioning signal to the base station, and the positioning signal can carry a sending time point of sending the positioning signal by the first UE. The base station can determine the time of flight of the positioning signal based on a receiving time point of receiving the positioning signal and the sending time point of sending the positioning signal, and then determines the distance between the first UE and the base station.

The base station can also determine an arrival angle of the positioning signal according to reception time difference of different antennas of the base station and a distance between the antennas.

The relative position between the first UE and the base station is determined according to the distance between the first UE and the base station and the arrival angle of the positioning signal.

In an embodiment, sending the first ranging information to the first UE includes:
sending the first ranging information indicating the relative position between the second UE and the base station to the first UE.

The relative position between the first UE and the second UE can be calculated by the first UE. The first UE can determine the relative position between the first UE and the second UE based on the relative position between the first UE and the base station and the relative position between the second UE and the base station.

The relative position between the first UE and the base station can be determined by the first UE based on a position of the first UE and a position of the base station sent by the base station. The relative position between the first UE and the base station can also be determined based on a measuring result of signals between the base station and the first UE.

The relative position between the second UE and the base station can be sent to the first UE by the base station. The relative position between the second UE and the base station can be determined by the base station based on position information of the base station and the second UE, or determined by the base station through a measurement result of signals between the base station and the second UE. Alternatively, the relative position between the second UE and the base station can be sent to the base station by the second UE after the second UE determines the relative position between the second UE and the base station.

For example, the base station receives the first ranging request, determines the relative position between the second UE and the base station, and determines the relative position between the first UE and the second UE based on the relative position between the first UE and the base station and the relative position between the second UE and the base station.

In the process of determining the relative position between the first UE and the second UE, it is not necessary to establish a direct communication connection between the first UE and the second UE. Thus, no additional communication protocol is required to coordinate the direct communication connection between the first UE and the second UE, and it is not necessary to consider whether signal qualities of the first UE and the second UE can meet the requirements of direct communication with each other.

In this way, when the first UE and the second UE do not establish a direct communication connection, the first UE obtains the relative position between the second UE and the base station from the base station, and then determines the relative position between the first UE and the second UE based on the relative position between the first UE and the base station and the relative position between the second UE and the base station, reducing the complexity caused by the need to establish a direct communication connection between the first UE and the second UE, and improving the efficiency of the first UE in determining the relative position between the first UE and the second UE.

In an embodiment, the method further includes the follows.
The relative position between the first UE and the base station is determined according to a receiving parameter of a wireless signal between the first UE and the base station; and
Third ranging information indicating a relative position between the first UE and the base station is sent to the first UE.

When calculating the relative position between the first UE and the second UE by the first UE, the relative position between the first UE and the base station can be sent to the first UE by the base station through the third ranging information.

The base station can determine the distance between the first UE and the base station on the base station side according to the receiving parameter of the wireless signal between the first UE and the base station. The receiving parameter can include the TOF of the wireless signal, the arrival angle of the wireless signal, etc. The method used by the base station to determine the relative position between the first UE and the base station will not be repeated here.

In an embodiment, obtaining the relative position between the second UE and the base station by performing the ranging between the base station and the second UE includes:

determining the relative position between the second UE and the base station based on a receiving parameter of a wireless signal between the second UE and the base station.

The relative position between the base station and the second UE can be measured by the base station.

The base station can determine the distance between the second UE and the base station according to the receiving parameter of the wireless signal between the second UE and the base station. The receiving parameter can include TOF of the wireless signal, an arrival angle of the wireless signal, etc.

For example, the base station can determine the distance between the second UE and the base station by measuring TOF of a signal. An implementation of TOF can be as follows. The base station sends a positioning signal to the second base station. The positioning signal can carry a sending time point of sending the positioning signal by the base station. The second UE can determine the time of flight of the positioning signal based on a receiving time point of receiving the positioning signal and the sending time point of sending the positioning signal, and then determines the distance between the second UE and the base station.

The base station can determine the arrival angle of the positioning signal according to the reception time difference of different antennas of the base station and a distance between the antennas.

The relative position between the second UE and the base station is determined based on the distance between the second UE and the base station and the arrival angle of the positioning signal.

In an embodiment, obtaining the relative position between the second UE and the base station by performing the ranging between the base station and the second UE includes the follows.

A second ranging request is sent; and

Fourth ranging information associated with the second ranging request is received from the second UE, in which the fourth ranging information is configured to indicate the relative position between the second UE and the base station The relative position between the base station and the second UE can be measured by the second UE.

After receiving the first ranging request, the base station can send the second ranging request to the second UE. After the second UE receives the second ranging request, the second UE can determine the relative position between the second UE and the base station.

The second UE can determine the relative position between the second UE and the base station based on position information of the second UE and position information of the base station.

The second UE can also determine the relative position between the second UE and the base station according to a receiving parameter of a wireless signal between the second UE and the base station.

For example, the base station sends a positioning signal to the second UE, such as the second ranging request. The second UE sends a response message to the base station after receiving the positioning signal, and the response message includes a response delay to the positioning signal. After receiving the response message, the base station can determine the time of flight of the signal according to a time point of sending the positioning signal, a time point of receiving the response message and the response delay, and then determines the distance between the second UE and the base station.

The following provides a specific example based on any of the above embodiments.

1. UE ranging is realized with the assistance of network, ranging is conducted between networks and UEs, and UE ranging related information is sent to UEs through the network, so as to achieve ranging between UEs. In this process, no direct information interaction is conducted between UEs.

2. UE sends a ranging request on Uu. After receiving the ranging request, the network completes the ranging process between the network and a target UE, and determines ranging information between the network and the target UE. For example, the UE that initiates the ranging request on Uu is an initialization UE.

3. After receiving the ranging request sent by the initialization UE, the network completes the ranging process between the network and the initialization UE, and determines the ranging information between the network and the initialization UE.

4. Based on the ranging information between the network and the target UE in step 2, the UE ranging between the initialization UE and the target UE is completed. A specific implementation method includes the follows.

a) The network sends the ranging information between the network and the target UE to the initialization UE, the initialization UE completes conversion calculation of the ranging information of the target UE, to obtain the ranging information between the initialization UE and the target UE, and completes the UE ranging.

b) The network performs conversion calculation on the ranging information between the network and the target UE obtained in step 2, to obtain the ranging information between the target UE and the initialization UE, and sends the obtained ranging information to the initialization UE. The initialization UE receives the ranging information sent by the network, and completes the UE ranging between the initialization UE and the target UE.

5. Based on the ranging information between the network and the target UE obtained by the network in steps 2 and 3, and the ranging information between the network and the initialization UE, the UE ranging between the initialization UE and the target UE is completed. A specific implementation method includes the follows.

a) The network sends the ranging information between the network and the target UE obtained in step 2 to the initialization UE. The initialization UE completes the ranging conversion calculation of the target UE according to the received ranging information and the ranging information obtained in step 3, to obtain the ranging information between the initialization UE and the target UE, and completes the ranging between the initialization UE and the target UE.

b) The network obtains the ranging information between the target UE and the initialization UE according to the ranging information between the network and the target UE obtained in steps 2 and 3, and the ranging information between the network and the initialization UE, and sends this obtained ranging information to the initialization UE to complete the UE ranging between the initialization UE and the target UE.

Figure 5:
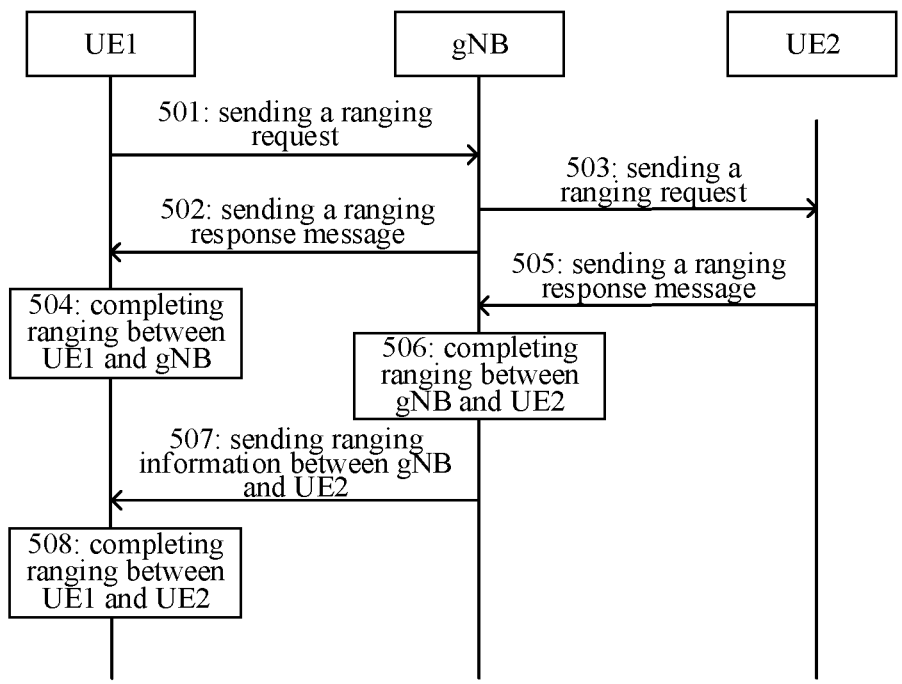
FIG. 5 is a flow chart of a method for position determining according to an exemplary embodiment of the present disclosure.

FIG. 5 is a schematic diagram of information interaction of UE for ranging. As illustrated in FIG. 5, the steps of UE for ranging include the following.

Step 501, UE1 sends a ranging request to gNB (network) (the UE1 is an initialization UE).

Step 502, the gNB sends a ranging response message to the UE1 after receiving the ranging request sent by the UE1.

Step 503, the gNB sends a ranging request information to UE2 (target UE) after receiving the ranging request sent by UE1. Order between steps 502 and 503 is not required.

Step 504, after receiving the ranging response message sent by the gNB, the UE1 completes ranging between the UE1 and the gNB.

Step 505, after receiving the ranging request sent by the gNB, the UE2 sends a ranging response message to the gNB.

Step 506, the gNB completes ranging between the gNB and the UE2 after receiving the ranging response message sent by the UE2.

Step 507, the gNB sends ranging information between the gNB and the UE2 to the UE1.

Step 508, the UE1 completes UE ranging between UE1 and UE2 according to the ranging information in steps 504 and 507.

Figure 6:
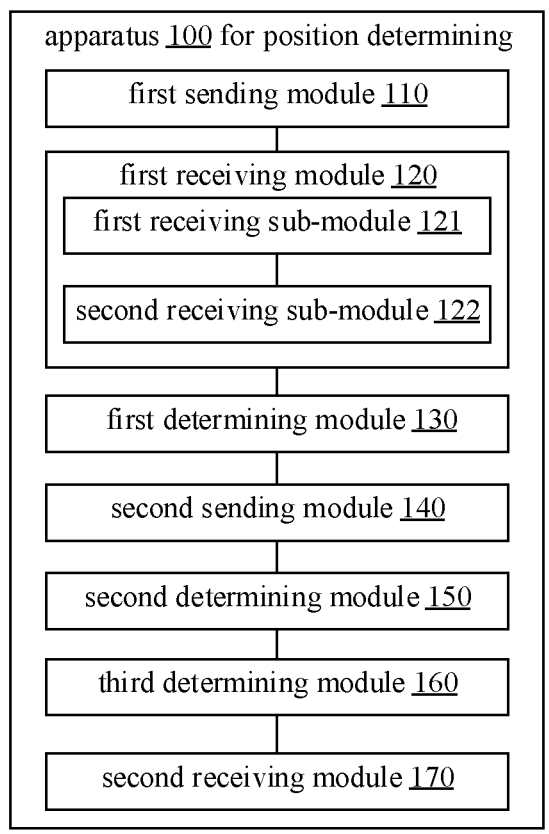
FIG. 6 is a block diagram illustrating an apparatus implemented in a user equipment for position determining according to an exemplary embodiment of the present disclosure.

The embodiment of the disclosure also provides an apparatus for position determining, which is implemented by a UE such as a terminal in a communication system. FIG. 6 is a block diagram of an apparatus 100 for position determining provided by an embodiment of the disclosure. As illustrated in in FIG. 6, the apparatus 100 includes a first sending module 110 and a first receiving module 120.

The first sending module 110 is configured to send a first ranging request to a base station, in which the first ranging request carries an identifier associated with a second UE, in which the first ranging request is at least associated with ranging between the base station and the second UE; and The first receiving module 120 is configured to receive first range information associated with the first range request from the base station.

In an embodiment, the first receiving module 120 includes:
  a first receiving sub-module 121, configured to receive, from the base station, first ranging information indicating a relative position between the first UE and the second UE.

In an embodiment, the apparatus 100 further includes:
a first determining module 130, configured to determine a relative position between the first UE and the base station according to a receiving parameter of a wireless signal between the first UE and the base station; and
a second sending module 140, configured to send second ranging information indicating the relative position between the first UE and the base station to the base station.

In an embodiment, the first receiving module 120 includes:
  a second receiving sub-module 122, configured to receive, from the base station, the first ranging information indicating a relative position between the second UE and the base station.

The apparatus 100 further includes:
a second determining module 150, configured to determine a relative position between the first UE and the second UE based on a relative position between the first UE and the base station and the relative position between the second UE and the base station determined based on the ranging.

In an embodiment, the apparatus 100 further includes:
a third determining module 160, configured to determine the relative position between the first UE and the base station according to a receiving parameter of a wireless signal between the first UE and the base station.

In an embodiment, the apparatus 100 further includes:
a second receiving module 170, configured to receive third ranging information determined by the base station according to a receiving parameter of a wireless signal between the first UE and the base station, in which the third ranging information is configured to indicate the relative position between the first UE and the base station.

Figure 7:
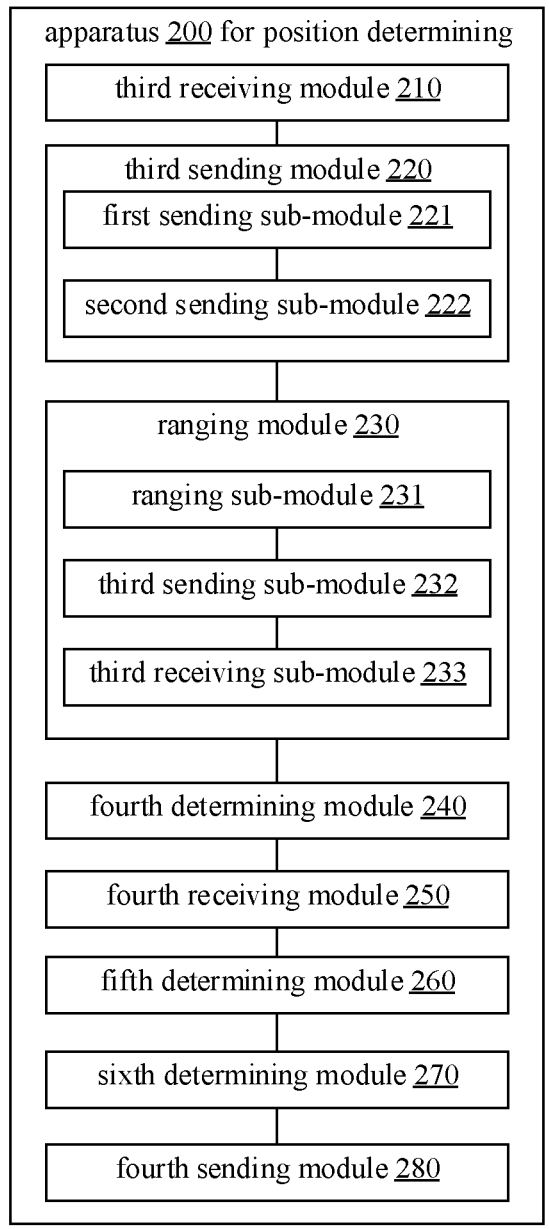
FIG. 7 is a block diagram illustrating an apparatus implemented in a base station for position determining according to another exemplary embodiment of the present disclosure.

The embodiment of the disclosure also provides an apparatus for position determining, which is implemented by a base station such as a terminal in a communication system. FIG. 7 is a block diagram of an apparatus 200 for position determining provided by an embodiment of the disclosure. As illustrated in in FIG. 7, the apparatus 100 includes a third receiving module 210 and a third sending module 220.

The third receiving module 210 is configured to receive a first ranging request from a first user equipment (UE), in which the first ranging request carries an identifier associated with a second UE, and the first ranging request is at least associated with ranging between the base station and the second UE; and The third sending module 220 is configured to send first range information to the first UE in response to the first range request.

In an embodiment, the apparatus 200 further includes:
  a ranging module 230, configured to obtain a relative position between the second UE and the base station by performing the ranging between the base station and the second UE according to the first ranging request.

In an embodiment, the apparatus 200 further includes:
  a fourth determining module 240, configured to determine a relative position between the first UE and the second UE based on a relative position between the first UE and the base station and the relative position between the second UE and the base station;

The third sending module 220 includes:
  a first sending sub-module 221, configured to send first ranging information indicating the relative position between the first UE and the second UE to the first UE.

In an embodiment, the apparatus 200 further includes:
  a fourth receiving module 250, configured to receive second ranging information determined by the first UE according to a receiving parameter of a wireless signal between the first UE and the base station, in which the second ranging information is configured to indicate the relative position between the first UE and the base station.

In an embodiment, the apparatus 200 further includes:
  a fifth determining module 260, configured to determine the relative position between the first UE and the base station according to a receiving parameter of a wireless signal between the first UE and the base station.

In an embodiment, the third sending module 220 includes:
  a second sending sub-module 222, configured to send the first ranging information indicating the relative position between the second UE and the base station to the first UE.

In an embodiment, the apparatus 200 further includes:
  a sixth determining module 270, configured to determine the relative position between the first UE and the base station according to a receiving parameter of a wireless signal between the first UE and the base station; and
  a fourth sending module 280, configured to send third ranging information indicating a relative position between the first UE and the base station to the first UE.

In an embodiment, the ranging module 230 includes:
a ranging sub-module 231, configured to determine the relative position between the second UE and the base station based on a receiving parameter of a wireless signal between the second UE and the base station.

In an embodiment, the ranging module 230 includes:
a third sending sub-module 232, configured to send a second ranging request; and
a third receiving sub-module 233, configured to receive fourth ranging information associated with the second ranging request from the second UE, in which the fourth ranging information is configured to indicate the relative position between the second UE and the base station.

With the method and the apparatus for position determining, the communication device and the storage medium provided by the embodiment of the present disclosure, the first UE sends the first ranging request to the base station, the first ranging request carries the identifier associated with the second UE, the first ranging request is at least associated with the ranging between the base station and the second UE, the first ranging information associated with the first ranging request is received from the base station. In this way, the first UE obtains the relative position between the second UE and the base station by sending the first ranging request. On the one hand, it realizes the relative positioning between UEs, on the other hand, it is no longer necessary to establish a communication connection between UEs, and the UEs are located by using the existing base station.

In an exemplary embodiment, the first sending module 110, the first receiving module 120, the first determining module 130, the second sending module 140, the second determining module 150, the third determining module 160, the second receiving module 170, the third receiving module 210, the third sending module 220, the ranging module 230, the fourth determining module 240, the fourth receiving module 250, the fifth determining module 260, the sixth determining module 270 and the fourth sending module 280 can be implemented by one or more central processing units (CPU), graphics processing units (GPU), baseband processors (BP), application specific integrated circuits (ASICs), digital signal processors (DSP), programmable logic devices (PLDs), complex programmable logic devices (CPLD), field programmable gate arrays (FPGA), general processors, controllers, micro controller units (MCU), microprocessors, or other electronic components, or may be implemented in combination with one or more RF (radio frequency) antennas, to perform the above methods.

Figure 8:
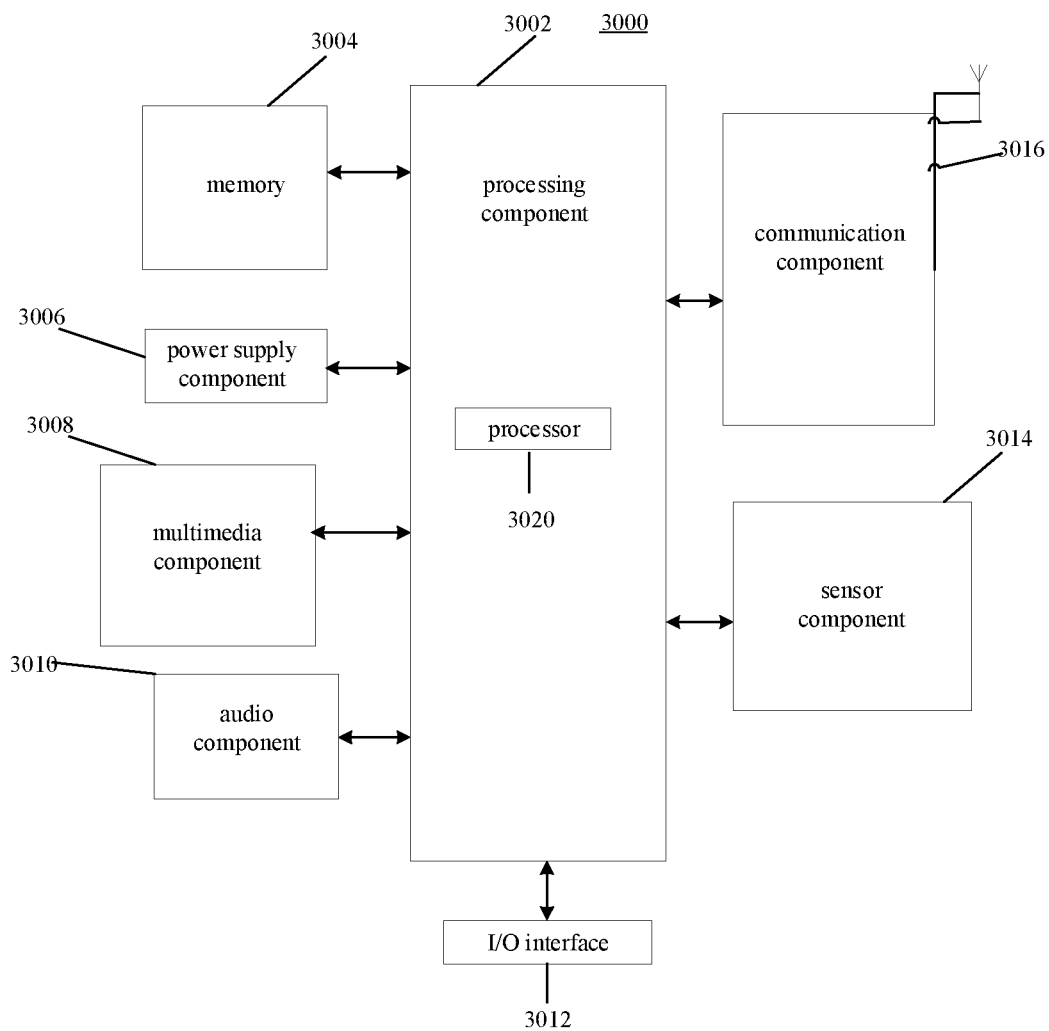
FIG. 8 is a block diagram illustrating a device for position determining according to an exemplary embodiment of the present disclosure.

FIG. 8 is a block diagram of a device 3000 for position determining according to an exemplary embodiment of the disclosure. For example, the device 3000 may be a mobile phone, a computer, a digital broadcasting terminal, a messaging device, a game console, a tablet device, a medical equipment, a fitness equipment, a personal digital assistant, and so on.

Referring to FIG. 8, the device 3000 may include one or more components of the followings: a processing component 3002, a memory 3004, a power supply component 3006, a multimedia component 3008, an audio component 3010, an input/output (I/O) interface 3012, a sensor component 3014, and a communication component 3016.

The processing component 3002 generally controls the whole operation of the device 3000, such as the operations related to display, phone call, data communication, camera operation and recording operation. The processing component 3002 may include one or more processors 3020 to perform instructions, to complete all or part of steps of the above method. In addition, the processing component 3002 may include one or more modules for the convenience of interaction between the processing component 3002 and other components. For example, the processing component 3002 may include a multimedia module for the convenience of interaction between the multimedia component 3008 and the processing component 3002.

The memory 3004 is configured to store various types of data to support the operation of the device 3000. Examples of the data include the instructions of any applications or methods operated on the device 3000, contact data, phone book data, messages, pictures, videos, etc. The memory 3004 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 3006 may provide power for all components of the device 3000. The power supply component 3006 may include a power supply management system, one or more power supplies, and other units related to generating, managing and distributing power for the device 3000.

The multimedia component 3008 includes a screen provided an output interface between the device 3000 and the user. In some embodiments, the screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 3008 includes a front camera and/or a rear camera. When the device 3000 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 3010 is configured to output and/or input an audio signal. For example, the audio component 3010 includes a microphone (MIC). When the device 3000 is in an operation mode, such as a call mode, a record mode, and a speech recognition mode, the microphone is configured to receive an external audio signal. The received audio signal may be further stored in the memory 3004 or sent via the communication component 3016. In some embodiments, the audio component 3010 further includes a speaker configured to output an audio signal.

The I/O interface 3012 provides an interface for the processing component 3002 and the peripheral interface module, and the peripheral interface module may be a keyboard, a click wheel, a button, etc. The button may include is but not limited to a home button, a volume button, a start button and a lock button.

The sensor component 3014 includes one or more sensors, configured to provide various aspects of status assessment for the device 3000. For example, the sensor component 3014 may detect the on/off state of the device 3000 and the relative positioning of the component. For example, the component is a display and a keypad of the device 3000. The sensor component 3014 may further detect the location change of the device 3000 or one component of the device 3000, the presence or absence of contact between the user and the device 3000, the orientation or acceleration/deceleration of the device 3000, and the temperature change of the device 3000. The sensor component 3014 may include a proximity sensor configured to detect the existence of the objects nearby without any physical contact. The sensor component 3014 may further include a light sensor such as a complementary metal oxide semiconductor (CMOS) or a charge-coupled device (CCD) image sensor, which is configured to use in imaging applications. In some embodiments, the sensor component 3014 may further include an acceleration transducer, a gyroscope sensor, a magnetic sensor, a pressure sensor or a temperature sensor.

The communication component 3016 is configured for the convenience of wire or wireless communication between the device 3000 and other devices. The device 3000 may access wireless networks based on communication standard, such as Wi-Fi, 2G or 3G, or their combination. In an embodiment, the communication component 3016 receives broadcast signals or broadcast-related information from an external broadcast management system via a broadcast channel. In an embodiment, the communication component 3016 further includes a near field communication (NFC) module to facilitate short-range communication. For example, the NFC module may be achieved based on a radio frequency identification (RFID) technology, an infrared data association (IrDA) technology, an ultra-wide band (UWB) technology, a blue tooth (BT) technology and other technologies.

In an embodiment, the device 3000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above methods.

In an embodiment, a non-transitory computer-readable storage medium is further provided which includes instructions, such as the memory 3004 including instructions, the instructions may be executed by the processor 3020 of the device 3000 to complete the above methods. For example, the non-transitory computer-readable storage medium may be a ROM, a random access memory (RAM), a CD-ROM, a magnetic tape, a floppy disk, an optical data storage device, etc.

After considering the specification and practicing the disclosure herein, those skilled in the art will easily think of other implementations of embodiments of the disclosure. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the disclosure is not limited to the precise structure described above and shown in the drawings, and various modifications and changes may be made without departing from its scope. The scope of the present disclosure is only limited by the appended claims.

What is claimed is:

1. A method for position determining, performed by a communication system comprising a first user equipment (UE) and a base station, and the method comprising:
    sending, by the first UE, a first ranging request to a base station, wherein the first ranging request carries an identifier associated with a second UE, wherein the first ranging request is at least associated with a ranging between the base station and the second UE; and
    receiving, by the first UE, first range information associated with the first range request from the base station;
    wherein the method further comprises:
    receiving, by the base station, the first ranging request from the first UE; and
    sending, by the base station, first range information to the first UE in response to the first range request;
    wherein the method further comprises:
    obtaining, by the base station, the relative position between the second UE and the base station by performing the ranging between the base station and the second UE according to the first ranging request;
    wherein obtaining by the base station the relative position between the second UE and the base station by performing the ranging between the base station and the second UE comprises:
    sending, by the base station, a second ranging request to the second UE; and
    receiving, by the base station, fourth ranging information associated with the second ranging request from the second UE, wherein the fourth ranging information is configured to indicate the relative position between the second UE and the base station.

2. The method as claimed in claim 1, wherein receiving the first range information associated with the first range request from the base station comprises:
    receiving first ranging information indicating a relative position between the first UE and the second UE from the base station.

3. The method as claimed in claim 2, further comprising:
    determining a relative position between the first UE and the base station according to a receiving parameter of a wireless signal between the first UE and the base station; and
    sending second ranging information indicating the relative position between the first UE and the base station to the base station.

4. The method as claimed in claim 1, wherein receiving the first range information associated with the first range request from the base station comprises:
    receiving the first ranging information indicating the relative position between the second UE and the base station from the base station;
    wherein the method further comprises:
    determining a relative position between the first UE and the second UE based on a relative position between the first UE and the base station and the relative position between the second UE and the base station determined based on the ranging.

5. The method as claimed in claim 4, further comprising:
    determining the relative position between the first UE and the base station according to a receiving parameter of a wireless signal between the first UE and the base station.

6. The method as claimed in claim 4, further comprising:
    receiving third ranging information determined by the base station according to a receiving parameter of a wireless signal between the first UE and the base station, wherein the third ranging information is configured to indicate the relative position between the first UE and the base station.

7. A method for position determining, performed by a base station, and the method comprising:

receiving a first ranging request from a first user equipment (UE), wherein the first ranging request carries an identifier associated with a second UE, and the first ranging request is at least associated with a ranging between the base station and the second UE; and sending first range information to the first UE in response to the first range request;

wherein the method further comprises:

obtaining a relative position between the second UE and the base station by performing the ranging between the base station and the second UE according to the first ranging request;

wherein obtaining the relative position between the second UE and the base station by performing the ranging between the base station and the second UE comprises:

sending a second ranging request to the second UE; and receiving fourth ranging information associated with the second ranging request from the second UE, wherein the fourth ranging information is configured to indicate the relative position between the second UE and the base station.

8. The method as claimed in claim 7, further comprising:

determining a relative position between the first UE and the second UE based on a relative position between the first UE and the base station and the relative position between the second UE and the base station;

wherein sending the first range information to the first UE comprises:

sending first ranging information indicating the relative position between the first UE and the second UE to the first UE.

9. The method as claimed in claim 8, further comprising:

receiving second ranging information determined by the first UE according to a receiving parameter of a wireless signal between the first UE and the base station, wherein the second ranging information is configured to indicate the relative position between the first UE and the base station.

10. The method as claimed in claim 8, further comprising:

determining the relative position between the first UE and the base station according to a receiving parameter of a wireless signal between the first UE and the base station.

11. The method as claimed in claim 7, wherein sending the first range information to the first UE comprises:

sending the first ranging information indicating the relative position between the second UE and the base station to the first UE.

12. The method as claimed in claim 11, further comprising:

determining the relative position between the first UE and the base station according to a receiving parameter of a wireless signal between the first UE and the base station; and sending third ranging information indicating a relative position between the first UE and the base station to the first UE.

13. The method as claimed in claim 7, wherein obtaining the relative position between the second UE and the base station by performing the ranging between the base station and the second UE comprises:

determining the relative position between the second UE and the base station based on a receiving parameter of a wireless signal between the second UE and the base station.

14. A communication system, comprising a UE and a base station, wherein the UE comprises a processor, a transceiver, a memory and programs stored on the memory and executable by the processor, wherein, when the processor executes the executable programs, a method for position determining is performed, the method comprising:

sending a first ranging request to a base station, wherein the first ranging request carries an identifier associated with a second UE, wherein the first ranging request is at least associated with a ranging between the base station and the second UE; and receiving first range information associated with the first range request from the base station;

the base station comprises a processor, a transceiver, a memory and programs stored on the memory and executable by the processor, wherein, when the processor executes the executable programs, a method for position determining is performed, the method comprising:

receiving the first ranging request from the first UE; and sending first range information to the first UE in response to the first range request;

wherein the method further comprises:

obtaining the relative position between the second UE and the base station by performing the ranging between the base station and the second UE according to the first ranging request;

wherein obtaining by the base station the relative position between the second UE and the base station by performing the ranging between the base station and the second UE comprises:

sending a second ranging request to the second UE; and receiving fourth ranging information associated with the second ranging request from the second UE, wherein the fourth ranging information is configured to indicate the relative position between the second UE and the base station.

15. The communication system as claimed in claim 14, wherein receiving the first range information associated with the first range request from the base station comprises:

receiving first ranging information indicating a relative position between the first UE and the second UE from the base station.

16. The communication system as claimed in claim 15, wherein the method further comprises:

determining a relative position between the first UE and the base station according to a receiving parameter of a wireless signal between the first UE and the base station; and sending second ranging information indicating the relative position between the first UE and the base station to the base station.

17. The communication system as claimed in claim 14, wherein receiving the first range information associated with the first range request from the base station comprises:

receiving the first ranging information indicating the relative position between the second UE and the base station from the base station;

wherein the method further comprises:

determining a relative position between the first UE and the second UE based on a relative position between the first UE and the base station and the relative position between the second UE and the base station determined based on the ranging.

18. The communication system as claimed in claim 17, wherein the method further comprises:

determining the relative position between the first UE and the base station according to a receiving parameter of a wireless signal between the first UE and the base station.

* * * * *